No. 787,528. PATENTED APR. 18, 1905.
M. MONDRAGON.
BREECH MECHANISM FOR QUICK FIRING CANNON.
APPLICATION FILED SEPT. 18, 1903.
5 SHEETS—SHEET 1.
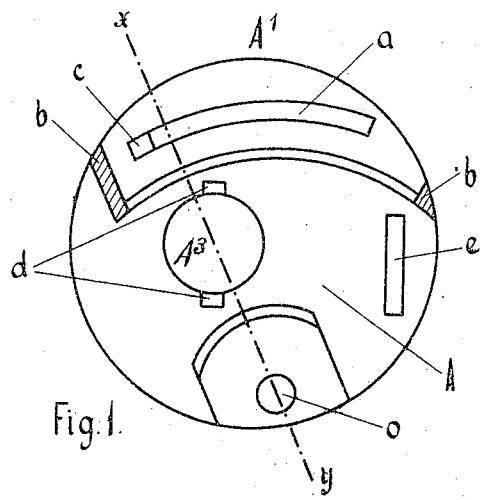
Fig. 1.
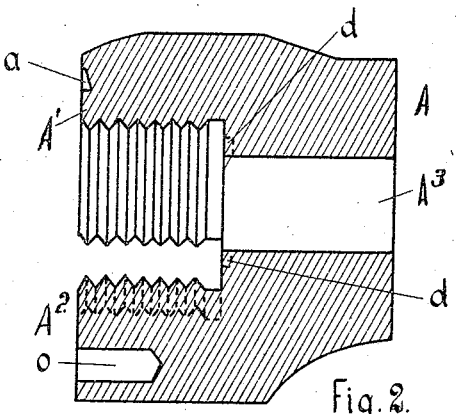
Fig. 2.
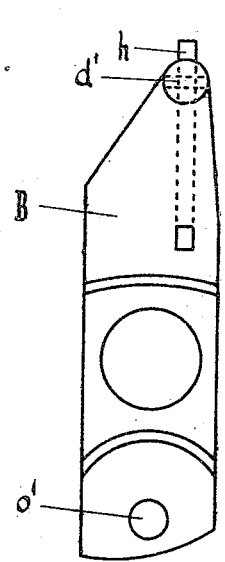
Fig. 3.
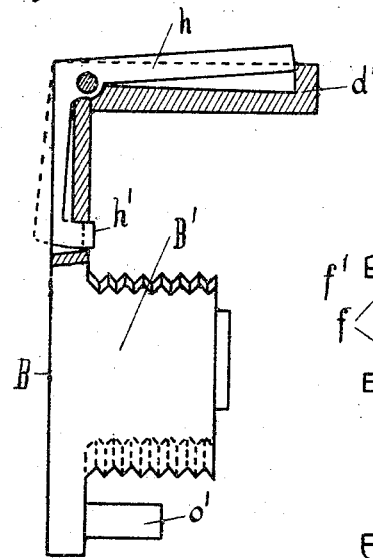
Fig. 4.
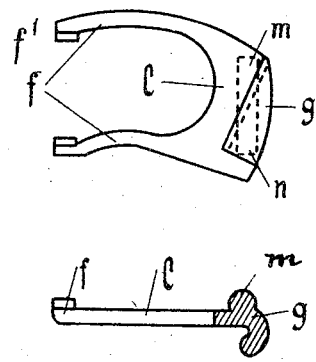
Fig. 5.
Fig. 6.
Witnesses:
A. Stanley
James V. Ross
Inventor:
M. Mondragon
By
Att'ys

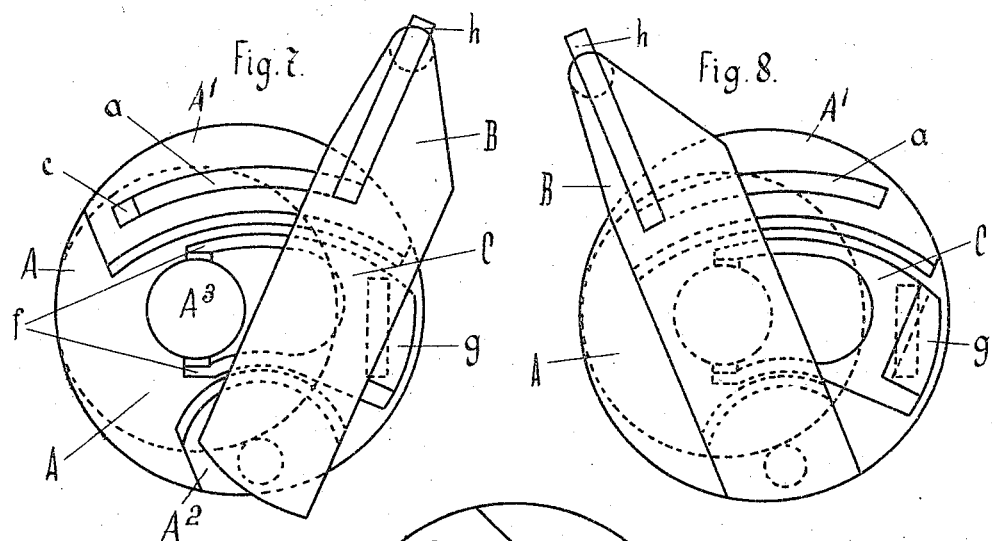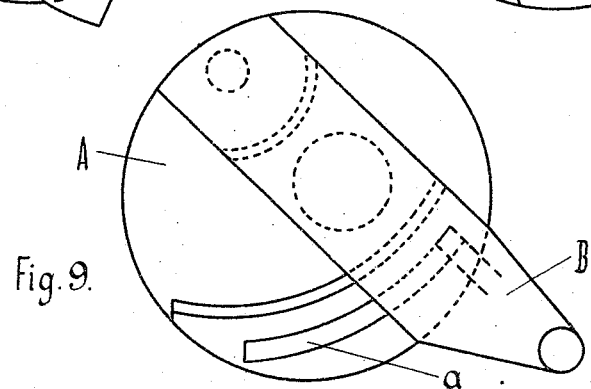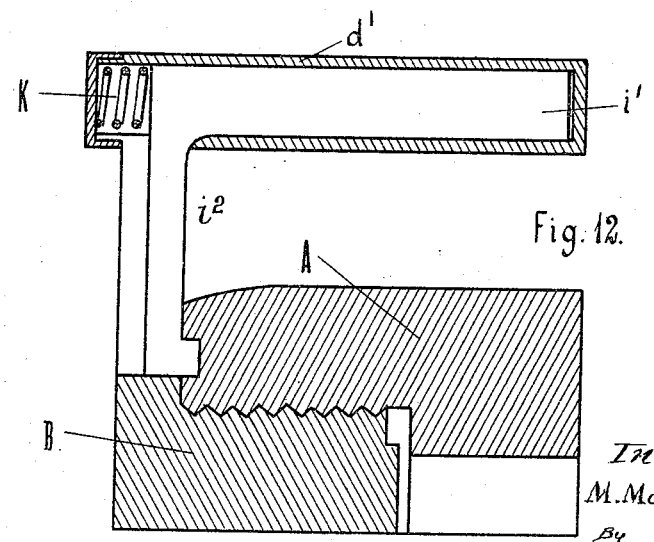

No. 787,528. PATENTED APR. 18, 1905.
M. MONDRAGON.
BREECH MECHANISM FOR QUICK FIRING CANNON.
APPLICATION FILED SEPT. 18, 1903.

5 SHEETS—SHEET 3.

Witnesses:
A. Stanley
James V. Ross

Inventor:
M. Mondragon,
By
Atty.

No. 787,528. PATENTED APR. 18, 1905.
M. MONDRAGON.
BREECH MECHANISM FOR QUICK FIRING CANNON.
APPLICATION FILED SEPT. 18, 1903.

5 SHEETS—SHEET 4.

Witnesses:
A. Stanley
James T. Ross

Inventor:
M. Mondragon,
By ......
Att'ys

No. 787,528. PATENTED APR. 18, 1905.
M. MONDRAGON.
BREECH MECHANISM FOR QUICK FIRING CANNON.
APPLICATION FILED SEPT. 18, 1903.

5 SHEETS—SHEET 5.

Witnesses:
A. Stanley
James V. Ross

Inventor:
M. Mondragon,
By
Attys

No. 787,528.                                                           Patented April 18, 1905.

UNITED STATES PATENT OFFICE.

MANUEL MONDRAGON, OF COURBEVOIE, FRANCE.

BREECH MECHANISM FOR QUICK-FIRING CANNON.

SPECIFICATION forming part of Letters Patent No. 787,528, dated April 18, 1905.

Application filed September 18, 1903. Serial No. 173,743.

*To all whom it may concern:*

Be it known that I, MANUEL MONDRAGON, a citizen of the Mexican Republic, residing at 205 Rue de Becon, Courbevoie, France, have invented certain new and useful Improvements in Breech Mechanism for Quick-Firing Cannon of Every Caliber, of which the following is a specification.

The object of this invention is to provide an improved breech mechanism; and it consists of a block oscillating in a threaded or grooved crown-segment eccentric to the bore of the cannon—that is, the oscillation of the block or the opening of the breech may be effected either automatically or by the hand itself or by gearing, and the ejection of the empty case or shell is effected by the weight of the block after the opening movement. This construction of breech is provided with all of the fittings generally regarded necessary, such, for instance, as mechanisms for obviating the risk of missing fire and premature explosions.

The mechanism may be constructed as represented in the annexed drawings, in which—

Figure 10:
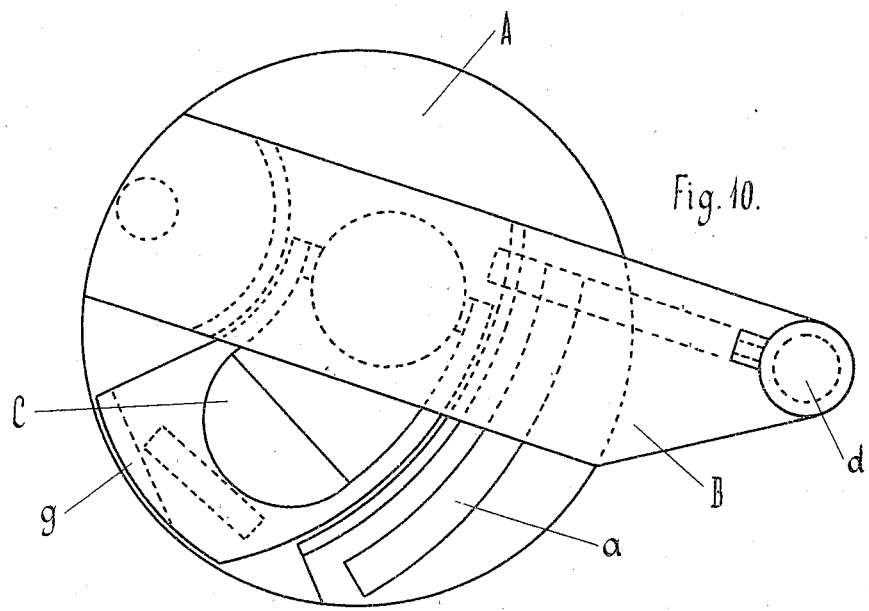
Figure 11:
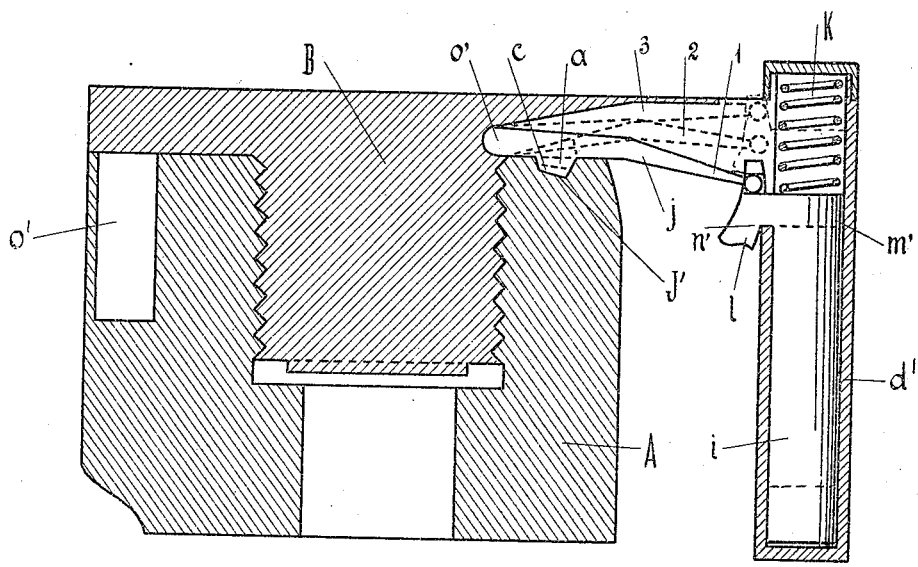
Figure 13:
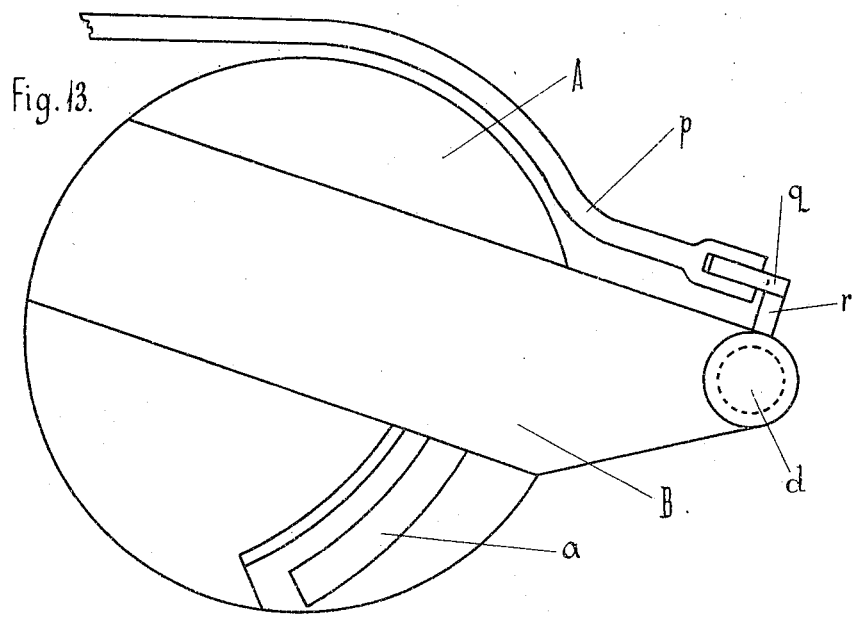
Figure 14:
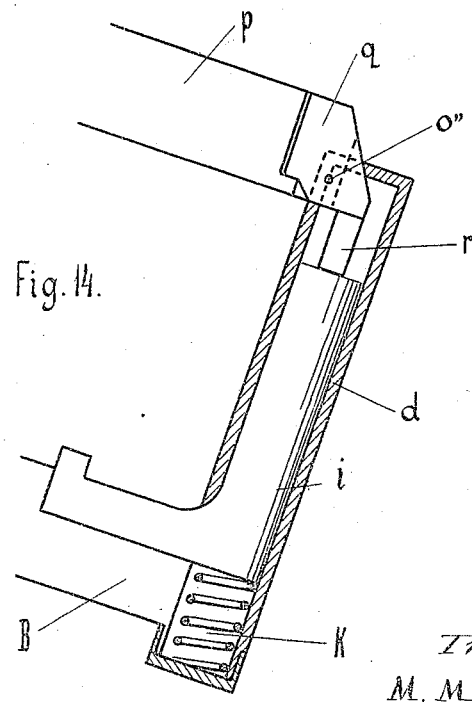
Figure 15:
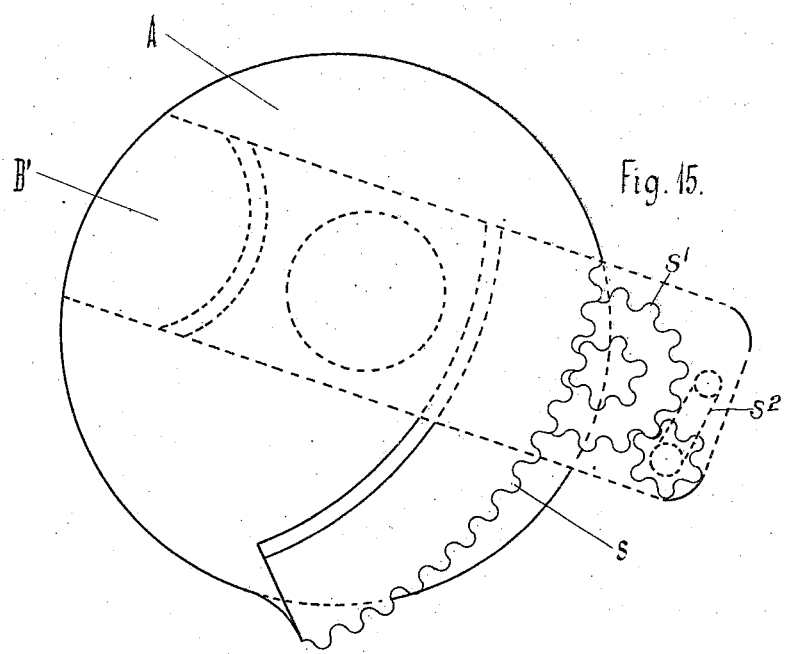
Figure 16:
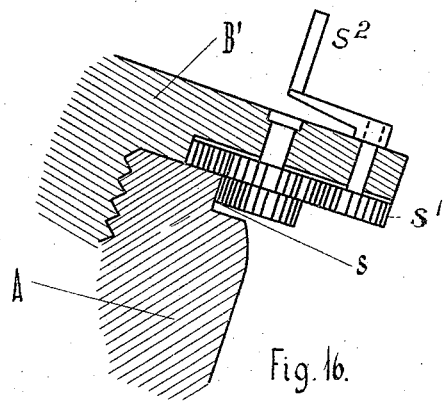

Figure 1 is a front view of the breech. Fig. 2 is a section through $xy$ of Fig. 1. Fig. 3 is a front view of the breech-block. Fig. 4 is a side view of the breech-block; Fig. 5, a plan view of the ejector; Fig. 6, a side view of Fig. 5; Fig. 7, a view of the breech open; Fig. 8, a view showing the breech closed. Fig. 9 shows an end view of a modified form of the device. Figs. 10 and 11 are respectively front and sectional views of an automatic breech-opening mechanism with safeties against missing fire and acting by inertia. Fig. 12 shows a different arrangement of safety device. Figs. 13 and 14 are respectively front and sectional views of a third arrangement of safety mechanism not actuated by force of inertia; Figs. 15 and 16, the application of the breech mechanism to heavy ordnance.

In constructing my invention I provide the breech A of the cannon with two projecting grooved crown-segments, the upper segment A' extending approximately half-way around the breech and the lower segment $A^2$ being short. A socket O is formed in the lower segment to receive the pivot-pin of the breech-block. The face of the upper segment A' has a concentric groove $a$, at one end of which is a recess $c$. The object of this groove and recess is to receive the beak of the locking-lever. If preferred, I may provide a stop at each end of the segment, such a construction being shown by the hatched lines $b$ in Fig. 1. It will be observed that at the upper and lower side of the bore $A^3$, I provide depressions $d$, in which the beaks of the ejecting-fingers rest, and between the two segments the body of the breech has a vertical groove or recess tangential to the bore, in which the outer end of the ejector is socketed.

The breech-block, Figs. 3 and 4, is composed of a flat bar B, of suitable width to cover the bore $A^3$, provided at one end with a pivot-pin O', which rests in the socket of the lower crown-segment. Centrally is a projecting boss B', provided with threaded or grooved sides to coöperate with the threaded or grooved segments A' $A^2$. The upper end of the bar has a handle $d'$ at right angles, and in this instance I prefer to have a right-angled lever $h$ recessed in the handle and in the bar, and in the lower end of the lever is an inturned prong or beak $h'$, which passes through an opening in the breech-bar and engages with the concentric groove $a$ of the segment A'.

The ejector (shown in Figs. 5 and 6) comprises a plate C, having two projecting fingers $f\ f$, the end of each finger being provided with a beak $f'\ f'$, which normally rest in the depressions $d$ of the breech-bore. The outer end of the ejector has a transverse rib $m$, which rests in the tangential groove $e$ of the breech, and in action the ejector has a slight rocking movement on this rib. On the opposite or outer side of the plate C is a shoulder $g$, against which the edge of the breech-block B' strikes when the block is thrown open, as shown, for instance, in Fig. 7.

The structure shown in Figs. 10 and 11 performs a twofold function—namely, to automatically open the breech and to assure safety against missing fire. It is important that the breech remain closed until discharge is assured, and to accomplish this I provide the hollow handle $d'$ with a sliding block $i$, on the upper end of which is an inwardly-projecting finger $l$, having a recess to receive the outer end of a lever *j*, this lever being substituted for the lever *h*. (Shown in Fig. 4.) This lever *j* has a beak J', which rests in the recess *c* and travels in the groove *a*, as hereinbefore explained. A spiral spring K rests between the head of the block *i* and the end of the handle, so as to normally keep the beak J' in the recess *c*. In operation the counter recoil of the discharge is sufficient to throw the block *i* to the rear or in the direction of this spring K, so that the breech-block will fall by gravity, thus providing an automatic opening of the breech and assuring the operator that the discharge has taken place. It is also obvious that with this form a rearward movement against the finger *l* compresses the spring K. It will be noticed that the position 1 shows the beak J' in the recess *c*. 2 shows the beak resting in the groove *a*, and 3 the beak entirely disengaged from the groove, which is the case when the block is to be unshipped.

In Fig. 12 I show a modified form wherein the block *i* has a right-angled arm *i²*, in the end of which is the beak to engage the groove and recess. In this case a spring K is also employed, and in this form, as in the one illustrated in Figs. 10 and 11, the moment the discharge takes place and the recoil disengages the beak from the recess the weight of the swinging end of the block-bar is sufficient to swing the block so that it uncovers the bore of the gun.

The automatic opening may also be effected by means of a rigid piece—as, for instance, the arm *p*, Figs. 13 and 14, attached to the carriage or other fixed part not affected by the recoil. The downwardly-projecting arm *r* passes freely through a slotted opening (not shown) in the upper side of the handle *d'*, so that when the handle is up in the firing position, as in Fig. 13, the arm will rest against the end of the block *i*. The rigid support *p* has a cam *q*, which is pivoted to the handle *d* and turns a limited distance on its pivot-pin O" during the recoil. When the recoil takes place, the arm *r* strikes the end of the block *i*, which forces the latter backwardly and releases the catch-lever from the recess.

For heavy ordnance I prefer to employ the construction shown in Figs. 15 and 16, since the block in such cases is generally too heavy to be manually operated by direct means. I provide a rack S on the breech A, and meshing with this rack is a system of gearing S' on the block-bar, operated by a crank S².

It is obvious that the automatic mechanism for releasing the breech-block may be dispensed with and that any system of percussion or electric firing may be employed without departing from the spirit of my invention.

In operation the handle is actuated by the recoil, thus disengaging the beak *h'* from the recess *c* of the breech, when the block-bar B can be swung to the right, so as to uncover the bore of the ordnance. As the block-bar B approaches its outer limit it strikes the shoulder *g* of the ejector, which imparts a rocking movement thereto and causes the inner ends of the fingers to move violently outwardly, carrying with them the shell. When the chamber or bore is again charged with a cartridge, the breech-block is thrown back to its normal position and locked by the beak *h'*.

What I claim as new is—

1. In breech mechanism for ordnance, a gun-breech having a separate or independent threaded or grooved crown-segment on each side of and eccentric to the bore of the gun, one of the segments having a stop at one end, in combination with a block having its contacting portions threaded or grooved correspondingly and adapted to oscillate on a pin concentric to the crown-segments, and provided with a bar which contacts with the stop on the segment in its firing position.

2. In breech mechanism for ordnance a gun-breech having a separate or independent threaded or grooved crown-segment on each side of and eccentric to the bore of the gun, one of the segments having a stop at one end, in combination with a block having its contacting portions threaded or grooved correspondingly, and adapted to oscillate on a pin concentric to the crown-segments, said block having a bar which contacts with the stop on the segment in its firing position, and means for oscillating the same manually.

3. In breech mechanism for ordnance, a gun-breech having integral therewith a separate or independent threaded or grooved crown-segment on each side of and eccentric to the bore of the gun, one of the segments having a stop at one end, in combination with a block having its contacting portions correspondingly threaded or grooved, and adapted to oscillate to and fro across the bore of the gun, and having a bar which contacts with the stop on the segments in its firing position.

4. In breech mechanism for ordnance, a gun-breech having integral therewith a threaded or grooved crown-segment eccentric to the bore of the gun and provided with a groove concentric with the grooved segment and a recess or depression at one end of said groove, in combination with a breech-block, having corresponding grooved or threaded contact portions adapted to oscillate across the breech, said block having an operating-handle and means on said handle and coöperating with the concentric groove and recess therein whereby said block can be locked when in its firing position.

5. In breech mechanism for ordnance, a gun-breech having a separate or independent threaded or grooved crown-segment on each side of and eccentric to the bore of the gun, and having a stop at the end of one segment, in combination with a breech-block comprising a main bar with a right-angled operating-handle, to engage with said stop in its firing position, and a projecting boss threaded or grooved to coöperate with the crown-segments of the breech.

6. In breech mechanism for ordnance, a gun-breech having integral therewith a separate or independent threaded or grooved crown-segment on each side of and eccentric to the bore of the gun, and having a stop at the end of one segment, in combination with a breech-block comprising a main bar to engage with said stop in its firing position with an operating-handle and a projecting boss threaded or grooved to coöperate with the crown-segments of the breech.

7. In breech mechanism for ordnance a gun-breech having integral therewith separate or independent threaded or grooved crown-segments on each side of and eccentric to the bore of the gun, and having a stop at the end of one segment, in combination with a breech-block comprising a main bar with an operating-handle, and an integral inwardly-projecting boss threaded or grooved to coöperate with the crown-segments of the breech.

8. In breech mechanism for ordnance, a gun-breech having a threaded or grooved crown-segment on each side of and eccentric to the bore of the gun, the outer face of one of said crown-segments having a concentric groove with a depression or recess therein, in combination with a breech-block comprising a main bar with a handle, a lever on said handle, having a beak to coöperate with said groove and depression or recess, and an inwardly-projecting boss threaded or grooved to coöperate with the crown-segments of the breech.

9. In breech mechanism for ordnance, a gun-breech having integral therewith a threaded or grooved crown-segment on each side of and eccentric to the bore of the gun, a concentric groove with a depression or recess at one end in the outer face of one of the segments, in combination with a breech-block pivoted at one end to the breech and provided with a bar to contact with said stop in its firing position having an integral inwardly-projecting boss threaded or grooved to coöperate with the crown-segments of the breech, an operating-handle and a lever provided with a beak, and engaging with said groove and depression or recess for locking said block.

10. In breech mechanism for ordnance, a gun-breech, having integral therewith a separate or independent threaded or grooved crown-segment on each side of and eccentric to the bore of the gun and having a stop at the end of one segment, a groove or socket in the breech tangentially disposed to the bore between said crown-segments, in combination with a breech-block having a threaded or grooved portion coöperating with the aforesaid crown-segments, and an ejector between said breech and block, having a transverse rib at its outer end which rests in the tangential groove of the breech, a shoulder which engages with the breech-block when it is opened, and fingers which extend to opposite sides of the bore, as and for the purposes set forth.

11. In breech mechanism for ordnance, a gun-breech having a projecting threaded or grooved crown-segment on each side of and eccentric to the bore, a groove or socket in the breech, between the segments, tangentially disposed to the bore, one of the segments having on its face a concentric groove with a depression or recess at one end, in combination with a breech-block comprising a bar, having integral therewith a boss threaded or grooved to coöperate with the crown-segments, a handle having a lever with a beak to engage with the groove and depression or recess in the breech and an ejector between the breech and block having at its outer end a transverse rib to engage the tangential groove of the breech, and provided with fingers which extend to opposite sides of the bore, and a shoulder on the outer side of the ejector to engage with the block, as set forth.

12. In breech mechanism for ordnance, a breech having projecting threaded or grooved crown-segments, and a concentric groove and depression or recess in one of said segments, in combination with a breech-block coöperating with said crown-segments, said breech-block having a locking-catch coöperating with said groove and depression or recess, and means for disengaging said catch by the counter recoil of the gun.

13. In breech mechanism for ordnance, a breech having integral therewith projecting threaded or grooved crown-segments, one of the segments having a concentric groove and a recess therein, in combination with a breech-block coöperating with said crown-segments, a handle on said breech-block, and a fastening-lever on said handle coöperating with the concentric groove and recess on the segment, and a sliding block within the handle coacting with the lever and actuating same by the counter recoil of the gun.

In testimony whereof I hereto set hand to this specification in the presence of two subscribing witnesses.

MANUEL MONDRAGON.

Witnesses:
LOMBARD BONNEVILLE,
JOHN RADCLIFFE HAYES.